United States Patent [19]

Mazeaud et al.

[11] Patent Number: 5,163,285
[45] Date of Patent: Nov. 17, 1992

[54] COOLING SYSTEM FOR A GAS TURBINE

[75] Inventors: Georges Mazeaud, Yerres; Francois J. P. Mirville, Melun; Patrick W. R. Saillot, Vaux Le Penil, all of France

[73] Assignee: Societe Nationale d'Etude et de Construction de Moteurs d'Aviation "S.N.E.C.M.A.", Paris, France

[21] Appl. No.: 634,520

[22] Filed: Dec. 27, 1990

[30] Foreign Application Priority Data

Dec. 28, 1989 [FR] France .................. 89 17298

[51] Int. Cl.⁵ ................................ F02C 6/04
[52] U.S. Cl. ...................... 60/39.07; 60/39.75
[58] Field of Search ............... 60/39.75, 39.83, 39.02, 60/39.07; 415/115, 116

[56] References Cited

U.S. PATENT DOCUMENTS

| | | | |
|---|---|---|---|
| 2,603,453 | 7/1952 | Sollinger | 415/115 |
| 2,618,120 | 11/1952 | Papini . | |
| 2,672,013 | 3/1954 | Lundquist | 60/39.83 |
| 2,783,965 | 3/1957 | Birmann . | |
| 4,187,675 | 2/1980 | Wakeman | 60/39.75 |
| 4,236,869 | 12/1980 | Laurello | 415/115 |
| 4,254,618 | 3/1981 | Elovic | 60/39.75 |
| 4,574,584 | 3/1986 | Hovan | 60/39.07 |
| 4,901,520 | 2/1990 | Kozak et al. | 60/39.07 |

FOREIGN PATENT DOCUMENTS

| | | |
|---|---|---|
| 1097374 | 7/1955 | France . |
| 2065179 | 6/1971 | France . |
| 2400618 | 3/1979 | France . |
| 2552164 | 3/1985 | France . |
| 2609500 | 7/1988 | France . |
| 2614654 | 11/1988 | France . |
| 1348127 | 3/1974 | United Kingdom . |
| 2084654 | 3/1982 | United Kingdom . |
| 2189845 | 11/1987 | United Kingdom . |

Primary Examiner—Richard A. Bertsch
Assistant Examiner—Timothy S. Thorpe
Attorney, Agent, or Firm—Bacon & Thomas

[57] ABSTRACT

A cooling system is disclosed including a drive shaft interconnecting a turbine rotor wheel with a compressor rotor wheel, a heat exchanger, and an auxiliary air compressor formed as part of the drive shaft which draws air from a portion of the compressor, through the heat exchanger and directs it onto portion of a gas turbine. The auxiliary air compressor may be a mixed-flow air compressor having a plurality of axial flow stages located upstream of a rotor portion with an impeller wheel to direct the cooling air onto portions of the gas turbine rotor and the stationary vanes. The heat exchanger may also be located externally of the gas turbine engine to improve the cooling of the cooling air before it is directed onto the gas turbine. It is envisioned that the system will be utilized with a gas turbine engine having a generally annular combustion chamber and that the auxiliary air compressor will be formed as part of the driving shaft interconnecting the gas turbine rotor wheel with the compressor rotor and be located within the space between the drive shaft and the interior of the combustion chamber. Thus, the rotation of the gas turbine rotor which drives the compressor rotor will also drive the rotating portion of the auxiliary, cooling air compressor.

8 Claims, 1 Drawing Sheet

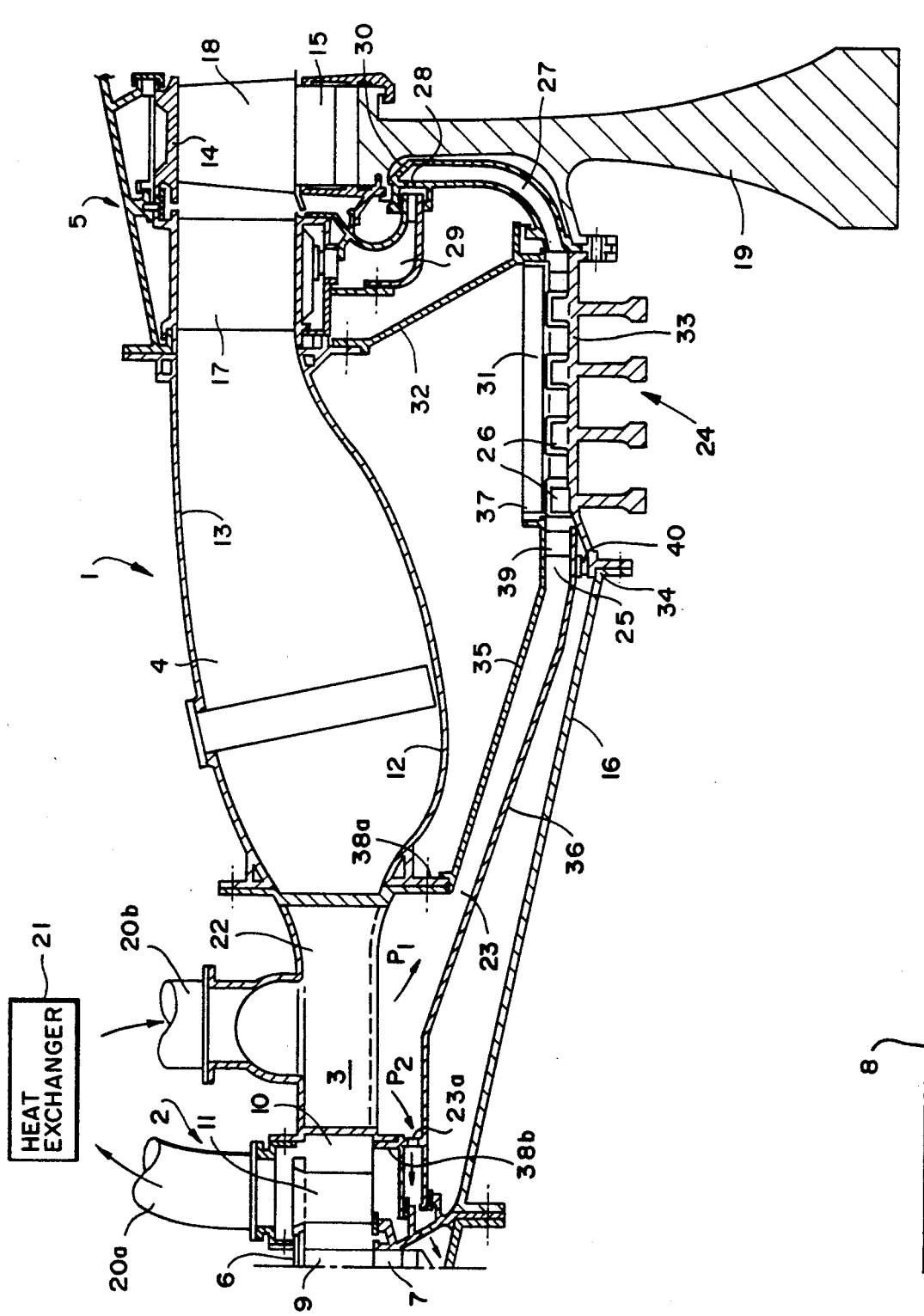

COOLING SYSTEM FOR A GAS TURBINE

BACKGROUND OF THE INVENTION

The present invention relates to an air cooling system for supplying cooling air to the turbine of a gas turbine engine.

The performance of an aircraft gas turbine engine is directly related to the maximum permissible temperature of the combustion gases. The amount of heat that the high pressure turbine components may withstand is generally the limiting factor on the upper limits of the gas temperature. It is well-known to provide cooling air to the turbine components located in the flow path of the high temperature gases, such as the rotor wheel blades and the stationary vanes, in order to raise the temperature of the high temperature gases, without exceeding the structural limitations of the turbine components.

The conventional practice in the known high pressure turbine cooling systems is to tap a portion of the air from the high pressure compressor and direct it onto the turbine blades and/or vanes. To accelerate the cooling air, accelerator means are provided in the air tapping zone. The air from the high pressure compressor is tapped in a centripetal manner through a rotor disk of the high pressure compressor with the accelerator means being located inside the rotor disk. The air is directed through a tube, conduit or passageway extending generally along the drive shaft interconnecting the turbine rotor with the compressor rotor. The air is then directed in a centrifugal manner onto the stationary vanes and the moving blades of the gas turbine.

Typical accelerating means for such cooling systems can be found in French Patent Applications A2,552,164; 2,609,500 and 2,614,654. In these systems, the accelerating means are located in the rotor disk of the high pressure compressor.

In British Patent 2,189,845, a system is disclosed for moving cooling air to a turbine which includes a centrifugal nozzle associated with a rotor wheel stage of the turbine.

While such systems have proven beneficial when used with today's turbojet engines, they are inadequate to cool the next generation gas turbine engines, especially air-breathing, turbojetramjet engines. The extremely high air temperature in the high pressure compressors of these gas turbine engines effectively precludes the direct use of this air as a cooling medium. Due to its initially high temperature, the cooling air must be cooled in a heat exchanger before directing it onto the turbine structure.

French Patent Application A2,400,618 discloses a method for air cooling the high pressure turbine of a gas turbine engine in which the cooling air is tapped from the combustion chamber and cooled in a heat exchanger located outside of the gas turbine engine envelope in an air-bypass duct. The cooled air moves into rear risers of the high pressure compressors rear support and then into an expansion valve, before being directed onto the gas turbine structure. The circuitous path of the cooling air with resultant pressure losses will prevent the rapid air circulation required by the future high pressure gas turbine engines.

SUMMARY OF THE INVENTION

The system of the present invention obviates the drawbacks of the known cooling air systems to provide maximum cooling of the gas turbine, thereby enabling the raising of the intake temperature and the consequent increase in efficiency of the engine.

The system of the present invention includes a drive shaft interconnecting a turbine rotor wheel with a compressor rotor wheel, a heat exchanger, and an auxiliary air compressor formed as part of the drive shaft which draws air from a portion of the compressor, through the heat exchanger and directs it onto portions of the gas turbine. The auxiliary air compressor may be a mixed-flow air compressor having a plurality of axial flow stages located upstream of a rotor portion with an impeller wheel to direct the cooling air onto portions of the gas turbine rotor and the stationary vanes. The heat exchanger may also be located externally of the gas turbine engine to improve the cooling of the cooling air before it is directed onto the gas turbine.

It is envisioned that the system will be utilized with a gas turbine engine having a generally annular combustion chamber and that the auxiliary air compressor will be formed as part of the driving shaft interconnecting the gas turbine rotor wheel with the compressor rotor and be located within the space between the drive shaft and the interior of the combustion chamber. Thus, the rotation of the gas turbine rotor which drives the compressor rotor will also drive the rotating portion of the auxiliary, cooling air compressor.

BRIEF DESCRIPTION OF THE FIGURE

The single FIGURE is a partial, longitudinal cross-sectional view of a gas turbine engine incorporating the cooling system according to the present invention.

DETAILED DESCRIPTION OF THE PREFERRED EMBODIMENT

The gas turbine engine 1 illustrated in the Figure comprises a high pressure compressor 2, of which only the last stage is illustrated, a diffuser casing 3, a generally annular combustion chamber 4 and a high pressure turbine 5.

The high pressure compressor 2 comprises a stationary external portion 6 and a rotating inner portion 7, which rotates about axis 8, the longitudinal axis of the gas turbine engine. A plurality of radially extending blades 9 extend from the rotor 7 to, in known fashion, compress the air moving through annular duct 10.

After the air in duct 10 has been aligned by passing over stationary vanes 11, it moves through diffuser casing 3 and enters the combustion chamber 4. The annular combustion chamber 4 is bounded by an inner wall 12 and an outer wall 13.

As is well-known in the art, fuel is mixed with the compressed air in the combustion chamber and is ignited to generate high-energy combustion gases which exit the downstream end of the combustion chamber 4 (toward the right as illustrated in the Figure) to drive the high pressure turbine 5. The high pressure turbine 5 comprises a stationary, external portion 14 surrounding a rotating portion 15. The rotating portion 15, which may comprise one or more rotor wheels, are linked to the rotor 7 of the high pressure compressor 2 by drive shaft 16. Thus, rotation of the rotating portion 15 also drives the rotating portion 7 of the compressor 2.

The high pressure turbine 5 also comprises stationary vanes 17 and moving blades 18 which are mounted to radially extend from the rim of rotor wheel 19, which is caused to rotate by the passage of the hot combustion gases emanating from the combustion chamber 4 over the blades 18.

The stationary vanes 17 as well as the moving blades 18 of the turbine 5 are cooled by cooling air tapped from the high pressure compressor 2. The cooling air is guided by a first manifold 20a into a heat exchanger 21 and is cooled by a cold fluid flowing through the heat exchanger. The cold fluid may be propellant, such as hydrogen or jet fuel. The heat exchanger 21 may be located externally of the gas turbine engine 1, as diagrammatically illustrated in the Figure.

Following cooling by the heat exchanger 21, the cooling air returns through a second manifold 20b to the gas turbine engine 1. The cooled air crosses at least one hollow brace member 22 located in the diffuser casing 3. A major portion P1 of the cooling air is directed toward the rotational axis 8 of the gas turbine engine 1 by means of an annular manifold 23 located in the annular space between the drive shaft 16 and the inner wall 12 of the combustion chamber 4. A minor portion P2 of the cooled air is directed in a forward direction through orifices 23a formed in the forward portion of the annular manifold 23 and is used to cool the latter stages of the high pressure compressor 2.

Auxiliary compressor 24, which may be a mixed flow compressor, is located between the rear end 25 of the annular manifold 23 and the high pressure turbine 5. The mixed-flow, auxiliary compressor 24 comprises a plurality of axial compressor stages 26 at the upstream side and an impeller wheel 27 located at the downstream side. The compressor 24 receives the cooling air circulating in the annular manifold 23 and recompresses it prior to directing it onto the high pressure turbine 5. From the discharge portion of the impeller wheel 27, the cooled and recompressed cooling air passes through orifices 28 and a manifold 29 before being directed onto the stationary vanes 17. Cooling air also passes through orifices 30 in order to be directed onto the moving blades 18.

Auxiliary compressor 24 comprises a stationary, external casing 31 attached to the inner wall 12 of the combustion chamber 4 by bracket 32. The generally cylindrical casing 31 may be formed in longitudinally split, opposite halves to facilitate the assembly of the auxiliary compressor 24.

The auxiliary compressor 24 also comprises a rotor portion 33 which is formed as a part of the drive shaft 16. The rotor portion 33 is affixed at its upstream end to a rear portion 34 of the drive shaft 16, and at its downstream end to the rotor wheel 19.

The annular manifold 23 is defined by walls 35 and 36 having a generally frusto-conical configuration. The external wall 35 is connected at its upstream end to the inner wall 12 of the combustion chamber 4 via flanges 38a extending from the diffuser casing 3. The downstream end of the external wall 35 is attached to the upstream portion 37 of external casing 31. The inner wall 36 is attached at its upstream side to flange 38b extending from the diffuser casing 3 and the high pressure compressor 2. The flange 38b defines orifices 23a enabling the cooling air to cool the blades of the high pressure compressor 2. The downstream end of the inner wall 36 is connected to the outer wall 35 by vane members 39 located near the auxiliary compressor 24 opposite the blades of the first stage 26 of the auxiliary compressor. A seal 40 is provided between the inner wall 36 and the drive shaft 16 near the downstream end 25 of the annular manifold 23.

Operation of the gas turbine engine will now be described in conjunction with the single figure. The hot gases circulating across the blades 18 rotate the rotor wheel 19 of the high pressure turbine 5 which, in turn, rotates the drive shaft 16 and the rotating portion of the high pressure compressor 2. Rotation of the rotor wheel 19 also rotates the rotating portion 33 of the auxiliary compressor 24.

Pressurized air tapped from the high pressure compressor 2 passes through the heat exchanger 21 where it is cooled and undergoes a substantial pressure drop. After exiting the heat exchanger 21 it passes into annular manifold 23 wherein it is compressed again by the auxiliary compressor 24 before it is directed onto the stationary vanes 17 and the movable blades 18 of the turbine 5 via the impeller 27.

The system according to the invention substantially improves the circulation of the cooling air cooled by the heat exchanger 21 over the vanes 17 and the blades 18. This increased cooling air circulation either decreases the temperature of these structures, or makes it possible to increase the temperature of the combustion gases while maintaining the given temperature of the vanes and blades. This enables the efficiency of the gas turbine engine to be increased without degrading the service life of the high pressure turbine components.

The foregoing description is provided for illustrative purposes only and should not be construed as in any way limiting this invention, the scope of which is defined solely by the appended claims.

We claim:

1. A system for supplying cooling air to a turbine of a gas turbine engine having a primary air compressor with at least one compressor rotor wheel, a combustion chamber and a turbine driven by exhaust gases from the combustion chamber, the turbine having at least one turbine rotor wheel, the system comprising:
   a) a drive shaft drivingly connected to the compressor rotor wheel;
   b) heat exchanger means;
   c) auxiliary air compressor means driven by the drive shaft to compress the cooling air after it has passed through the heat exchanger means wherein the auxiliary air compressor includes a plurality of axial flow stages with rotor portions of the auxiliary compressor drivingly connected between the drive shaft and the turbine rotor wheel;
   d) conduit means tapping a portion of the air passing through the primary air compressor and directing it through the heat exchanger means to lower the temperature of the tapped air wherein the conduit means includes a generally annular manifold portion located downstream of the heat exchanger means to direct cooling air into the auxiliary air compressor; and,
   e) means to direct the air emanating from the auxiliary air compressor onto portions of the turbine to cool the portions.

2. The cooling air system of claim 1 wherein the gas turbine combustion chamber is generally annular in configuration having an inner annular wall extending around the drive shaft wherein the generally annular manifold portion is located between the drive shaft and the inner annular wall.

3. The cooling air system of claim 2 wherein the generally annular manifold is defined by:
   a) an outer manifold wall having an upstream end attached to the inner annular wall of the combustion chamber and a downstream end attached to a stationary casing of the auxiliary air compressor; and, b) an inner manifold wall spaced from the outer manifold wall, and having an upstream end attached to the primary air compressor and a downstream end attached to the downstream end of the outer manifold wall.

4. The cooling air system of claim 3 further comprising a rotating seal operatively interposed between the inner manifold wall and the drive shaft.

5. The cooling air system of claim 1 wherein the heat exchange means is located externally of the gas turbine engine.

6. The cooling air system of claim 1 further comprising a diffuser casing interposed between the primary air compressor and the combustion chamber.

7. The cooling air system of claim 1 wherein the conduit means comprises:

a) a first conduit interconnecting the primary air compressor and the heat exchange means so as to direct a portion of air from the primary compressor into the heat exchange means;

b) a generally annular manifold having an upstream end and a downstream end to direct air into the auxiliary air compressor; and, c) a second conduit interconnecting the heat exchange means and the generally annular manifold so as to direct air from the heat exchange means into the generally annular manifold.

8. The cooling air system of claim 1 wherein the auxiliary compressor includes a stationary casing formed in two portions.

* * * * *